(12) United States Patent
Johnson

(10) Patent No.: US 12,024,331 B2
(45) Date of Patent: Jul. 2, 2024

(54) DEVICE AND METHOD FOR APPLYING A CLIP-STYLE IDENTIFICATION TAG AROUND THE TWINE OF A HAY BALE

(71) Applicant: Ryan P. Johnson, Somerset, WI (US)

(72) Inventor: Ryan P. Johnson, Somerset, WI (US)

(73) Assignee: Harvest Tec, Inc., Hudson, WI (US)

( * ) Notice: Subject to any disclaimer, the term of this patent is extended or adjusted under 35 U.S.C. 154(b) by 367 days.

(21) Appl. No.: 16/974,142

(22) Filed: Oct. 19, 2020

(65) Prior Publication Data

US 2022/0153466 A1 May 19, 2022

(51) Int. Cl.
*B65C 7/00* (2006.01)
*A01F 15/08* (2006.01)

(52) U.S. Cl.
CPC ............... *B65C 7/00* (2013.01); *A01F 15/08* (2013.01)

(58) Field of Classification Search
CPC .................................... B65C 7/00; A01F 15/08
See application file for complete search history.

(56) References Cited

U.S. PATENT DOCUMENTS

| | | | | |
|---|---|---|---|---|
| 4,332,193 A | * | 6/1982 | Noyes | G06K 1/121 101/93.01 |
| 2007/0175341 A1 | * | 8/2007 | Roberts | A01F 15/0816 100/102 |
| 2012/0048129 A1 | * | 3/2012 | Smith | A01F 15/08 235/375 |
| 2014/0157999 A1 | * | 6/2014 | Verhaeghe | B65C 3/02 100/29 |
| 2022/0167560 A1 | * | 6/2022 | Herbers | A01F 15/0825 |
| 2022/0346323 A1 | * | 11/2022 | Hamilton | A01F 15/0825 |

* cited by examiner

*Primary Examiner* — Gary C Hoge
(74) *Attorney, Agent, or Firm* — Skinner And Associates; Joel Skinner

(57) ABSTRACT

A tagging device follows a prescribed method of attaching an identification tag to the twine of a bale as it is formed. The tagging device is sequenced to insert a clip-type tag on top or end of the bale. The tag can alternatively be numbered in a consecutive series, printed with a bar code or QRC code, have an RFID inlay applied to its surface with a index number that relates to information about the bale or has information about the bale written to the tag.

6 Claims, 7 Drawing Sheets

DEVICE AND METHOD FOR APPLYING A CLIP-STYLE IDENTIFICATION TAG AROUND THE TWINE OF A HAY BALE

BACKGROUND OF THE INVENTION

1. Field of Invention

The present invention relates, generally, to crop harvesting. Particularly, the invention relates to a hay baler and a device and method to apply identification tags. The present invention is most particularly suitable for use in and for rectangular (often called "square") hay balers.

2. Background Information

The term "hay" usually applies to crops of alfalfa or a variety of grass that is harvested by a baler that compacts the loose crop into packages that can be handled or transported and are normally referred to as "bales". Bales are formed by an agricultural implement commonly referred to as a hay baler. It is typical for a hay baler to form numerous bales during a period of operation. There are many reasons to individually identify bales with a tag including inventory control of the bales, identification of the location of harvest of the bales, weight of the bales, moisture of the bales and quality labelling of the hay in the bale.

Inventory control for bales is of interest for monitoring the amount of hay currently in a location. The optimum time to apply an identification tag as the bale is being formed by the hay baler to assure each bale is entered into an inventory record-keeping system. If the hay is subsequently moved. The identification tag can be referenced to get a count of bales by location of storage or utilization. As the hay bales are fed to livestock, sold or processed, reading identification tags on the bales can record the removal from an inventory record keeping system.

Identifying the location of harvest is another application where individual identification tags are useful. Crop varieties and conditions of hay can vary between field locations. Identifying certain properties such as genetic characteristics and chemical treatment may be useful in determining how the hay bales are utilized and if a record of the field of harvest can be associated with an identification tag on a bale, those characteristics can be identified.

It is important to monitor the weight of the bale to calculate the yield from the field where the bale was produced. Also knowing the weight of the bale will aid in decisions on how to load transport vehicles with multiple bales.

Hay bales are fed primarily to ruminant animals including cattle sheep and goats. The quality constituents of the hay can affect how ruminant animals respond to the feeding of hay are primarily net energy, in vitro digestibility, acid detergent fiber, neutral detergent fiber, protein, and moisture. The values of these factors usually vary significantly from bate to bale and monitoring them is important so that the performance of the animal fed the hay in terms of daily weight gain or milk production can be properly managed by supplementing the diet of the livestock with other sources of feed to balance the values of the constituents measured in the hay. An identification tag will allow for a bale to be associated with the individual characteristics of the bale monitoring it as it is baled and adjust the feeding for optimum utilization.

A previous patent on the tagger, A Device for applying Tags to Continuous Moving Objects, U.S. Pat. No. 7,717,149, covered a tagging device mounted on hay balers with adhesive hacking. Using the backing to adhere the tag as it is wrapped around the twine holding the bale together has proved to be too unreliable due to the dust in the environment surrounding the formation of the bale and interfering with the tag sticking.

BRIEF SUMMARY OF THE INVENTION

The present invention provides for a tagging device to follow a prescribed method of attaching an identification tag to the twine of a bale as it is formed. The tagging device is sequenced to insert a clip-type tag on top or end of the bale. The tag can alternatively be numbered in a consecutive series, printed with a bar code or QRC code, have an RFID inlay applied to it's surface.

DETAILED DESCRIPTION

Figure 1:
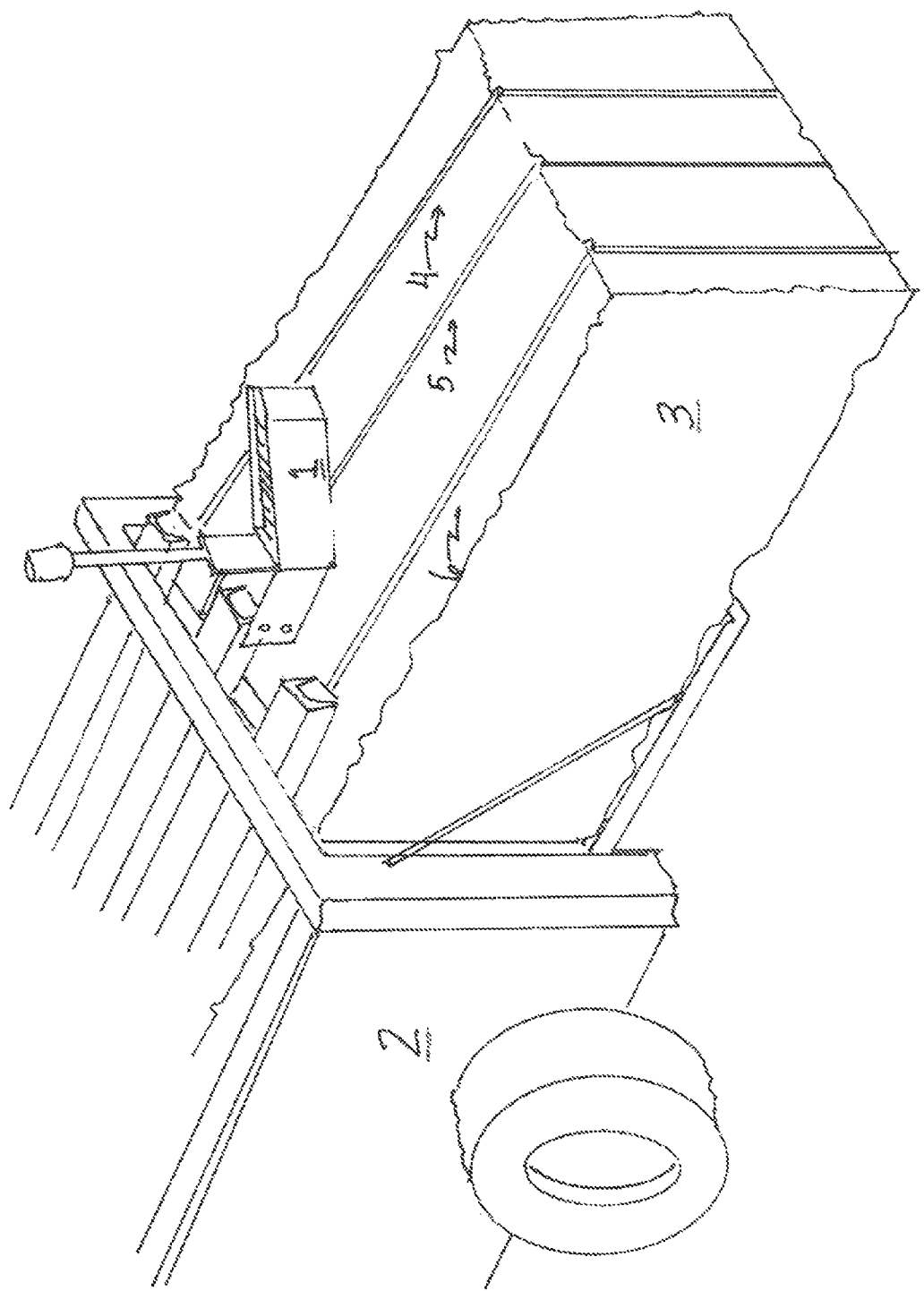
FIG. 1 is a perspective view of the tagging device positioned over the bale as it is delivered from a hay baler.

A tagging device 1 in FIG. 1 is mounted in a position on the top or end of a hay baler 2 so that it is positioned above or behind and in line with one of the twines 4 that hold the bale 3 together. The mounting position for the tagger can be above and in line with any of the twines 5 and 6 that hold the bale together. To assure operation of the tagging device will not interfere with other functions of the baler, the tagging device is normally mounted over the bale as it is discharged from the baler. When the bale is in the position near where it will be discharged from the baler, the twine has been tied and there is tension on the twine as it is designed to hold the bale together. In this state, the tag can be inserted around the twine reliably.

Figure 2:
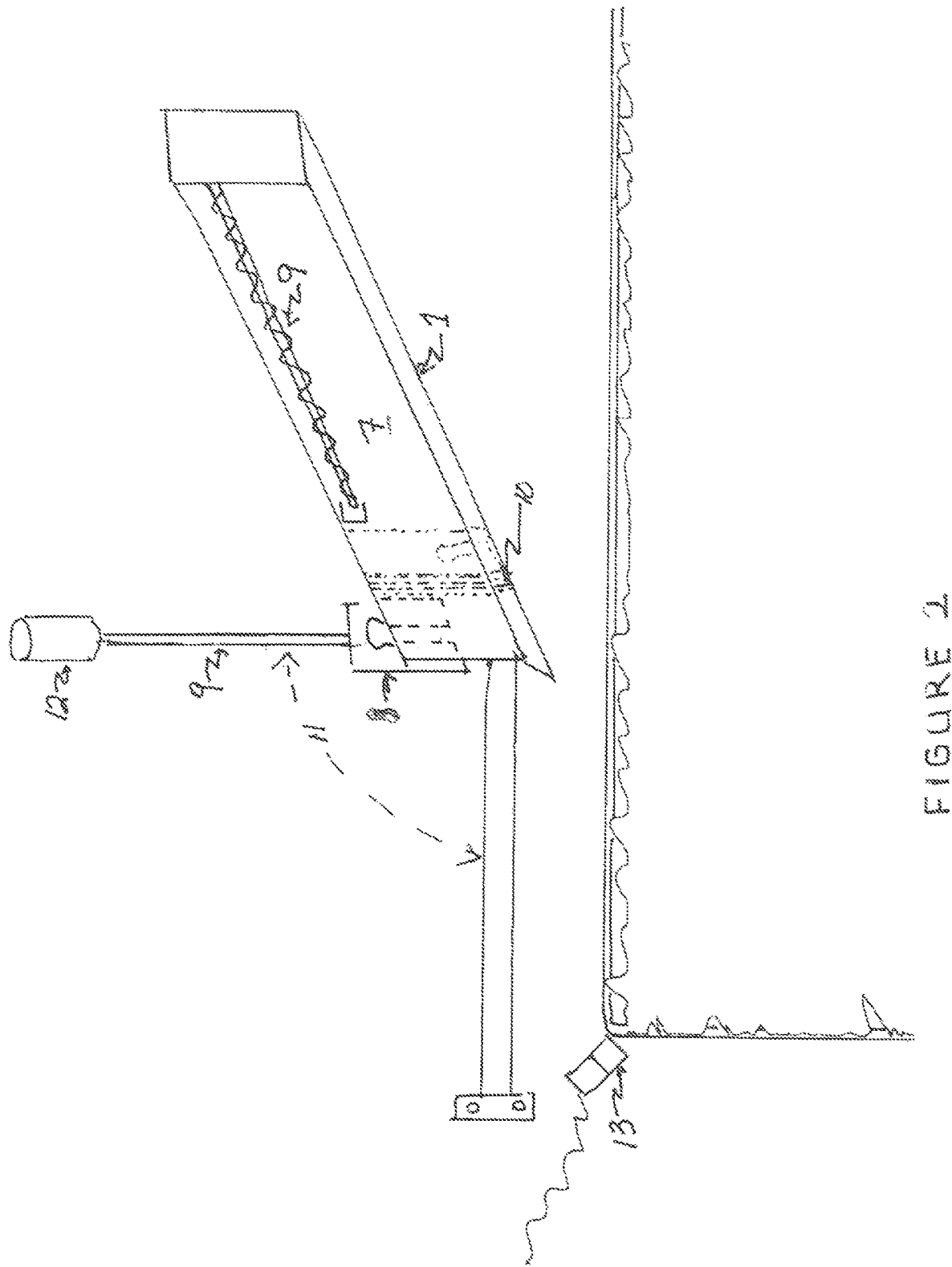
FIG. 2 is a side view of the tagging device above a bale
Figure 3:
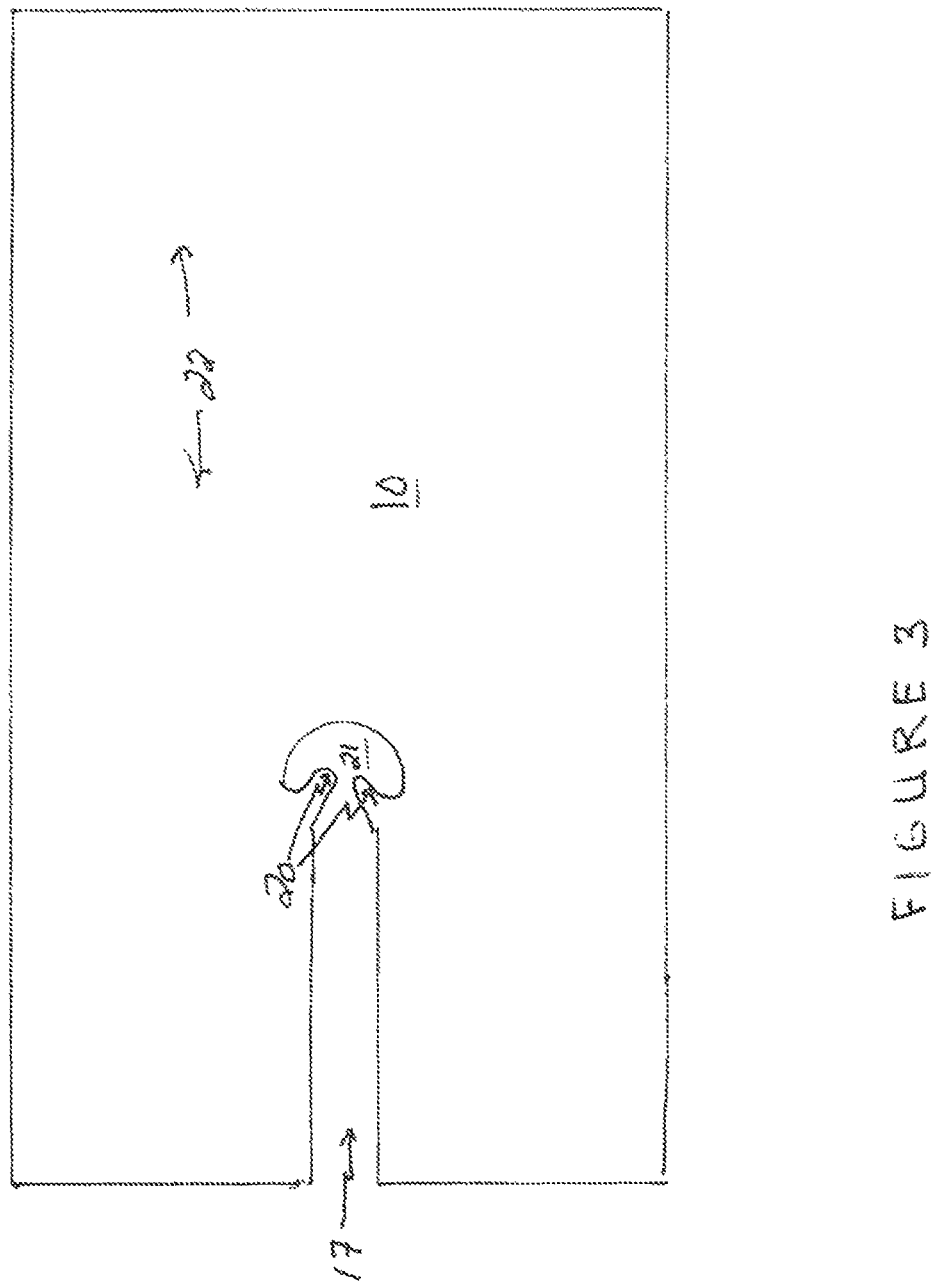
FIG. 3 is a view of the tag

The tagging device 3 in FIG. 2 has three major components, a tag magazine 7, a tag inserter 8 and a plunger 9. The clip-style tags 10 in FIG. 3 are constructed from plastic or metal of rigid material of a thickness between five and three hundred hundredths of a millimeter in thickness and the magazine 7 is long enough to hold between ten and three hundred tags The tags are held by a tensioning device 9 and are advanced to a position so that the inserter 8 can push the tags out of the magazine and around the twine 4 one at a time when the inserter is pushed downward by the plunger 9. The plunger moves downward powered by an actuator 12 at an angle rearward 11 between ten and thirty degrees from vertical to assure that the tag attaches around the twine as the bale 2 is moving rearward and with enough displacement for the plunger push the tag completely out of the magazine 7 and to press the tag into the outer surface of the bale which takes a force of between three and fifty foot-pounds to overcome the friction present from the surrounding hay. The actuator 12 then reverses direction leaving the tag attached to the bale. It can be powered by air, hydraulic pressure or electricity when it receives a signal from the baler that a new bale is in position under the tagger. This signal can originate from the baler that normally counts bales by monitoring the tying of the twine 4, 5 and 6. Alternatively, a sensor 13 can be mounted to detect the gap between individual bales and signal to the actuator to cycle the plunger.

Figure 4:
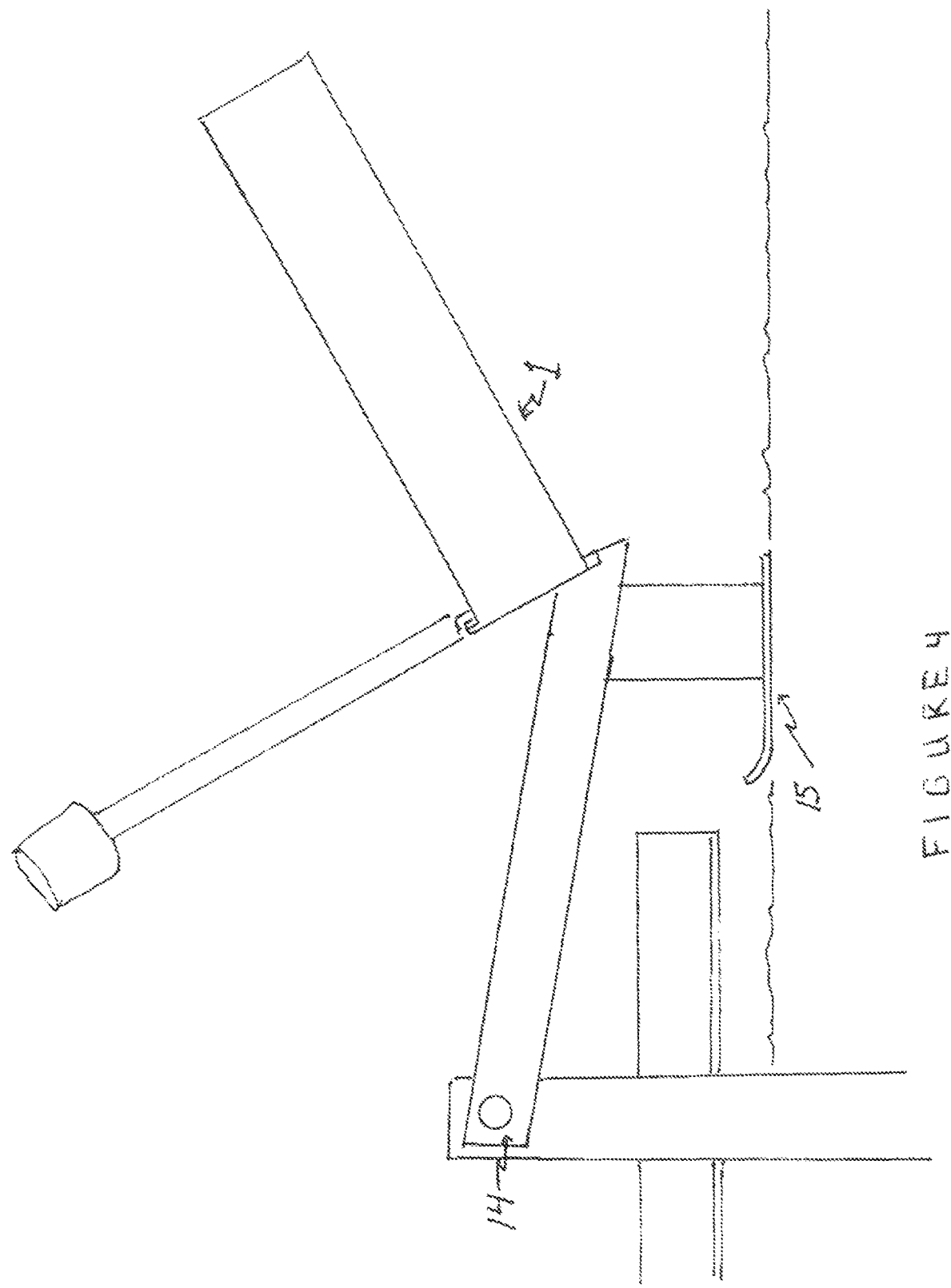
FIG. 4 is a view of the tagging device with its height controlled by a skid plate
Figure 5:
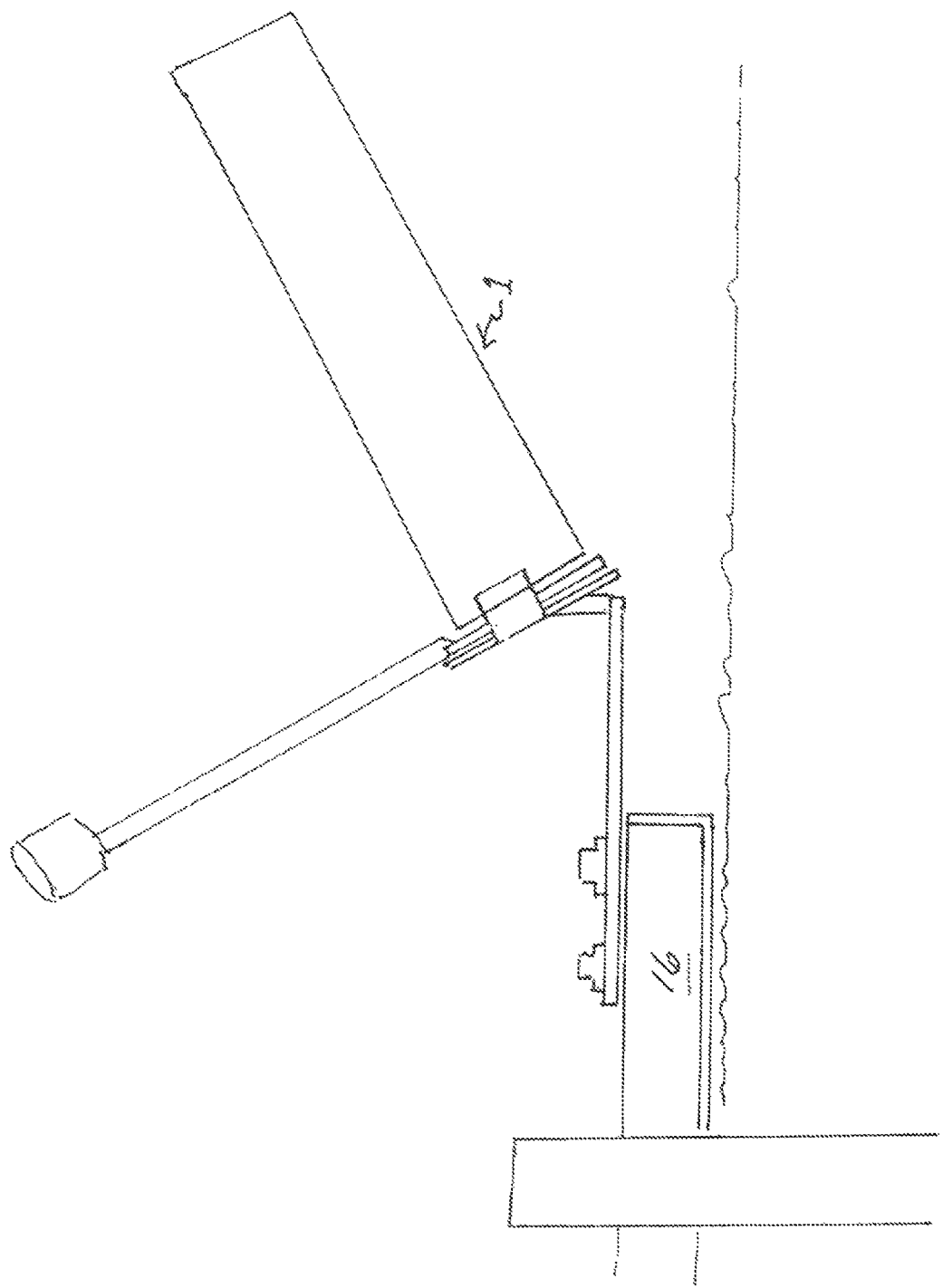
FIG. 5 is a view of the tagging device attached to the baler's to compression door to control height.

The tagging device 1 is held at a constant height over the bale 3. One method in holding the height by mounting it with a pivot point 14 in FIG. 4 and having it riding on the top of the bale with a skid plate 15 holding the device. Another method to hold the tagging device at the constant height over the bale is to attach it to the top compress on door 16 in FIG. 5 which rides on top of the bale so that attaching the tagging device to it would result in a constant height above the bale.

The tag 10 in FIG. 3 has some unique features that result in functionality when used on a hay bale. There is a slot 17 at the bottom of the tag so that it can be pressed down around the twine to a position 19. Once the twin is in that position, the twine is held there by one, two or more retainer ears 20 that prevent the twine from exiting from the tag. This feature keeps the tag on the bale as it is later handled in position 21. The area 22 above the twine position 21 is used to hold information about the bale. This information can be a simple index number that is used to reference a data base on the bales located elsewhere. The index number can be printed on the tag, carried in a bar code or QRC code or read in a RFID chip. The code also needs to be referenced in the baler's memory or referenced in a memory that is part of the tagging device. The code reference is associated with information collected about the bale it represents as the bale is formed including bale weight, moisture, location of the bale formation, feed quality and time and date of the baling. Alternatively, the information on the bale can be recorded to the tag if the tagging device has access to the information collected and a means to write the information to the tag.

Figure 6:
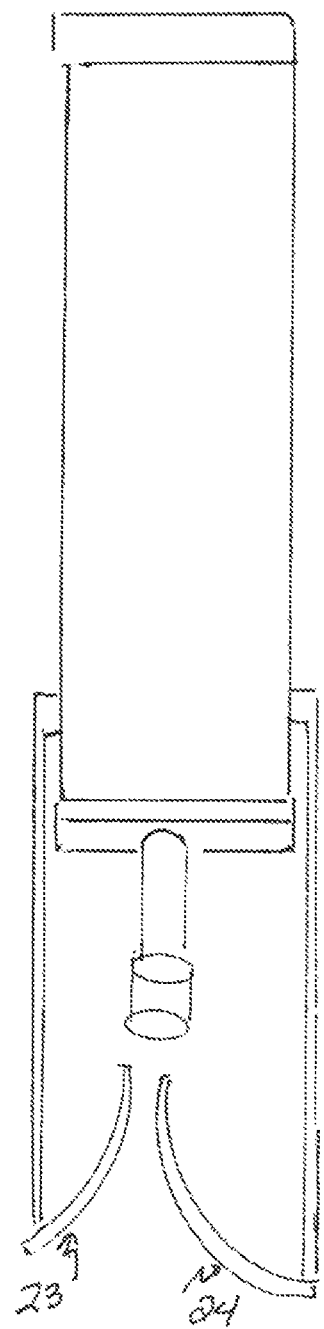
FIG. 6 is the twine guide in front of the tagging device

The twine 4 has to line up with the slot in the tag 17 so when the inserter moves downward pushing the tag into the bale, the tag is caught by the retainer ears 20 and stays on the twine as the inserter retracts. To assure that the twine is lined up with the slot on the tag, alignment devices 23 and 24 in FIG. 6 are normally positioned so that before the twine reaches the tagging device, it is moved left or right by the alignment device to line it up with the tag slot. The alignment device is normally two fixed guides or alternatively a mechanical device that moves the twine or the tagger to establish the required alignment between the twine 4 and the tagging device 1.

Figure 7:
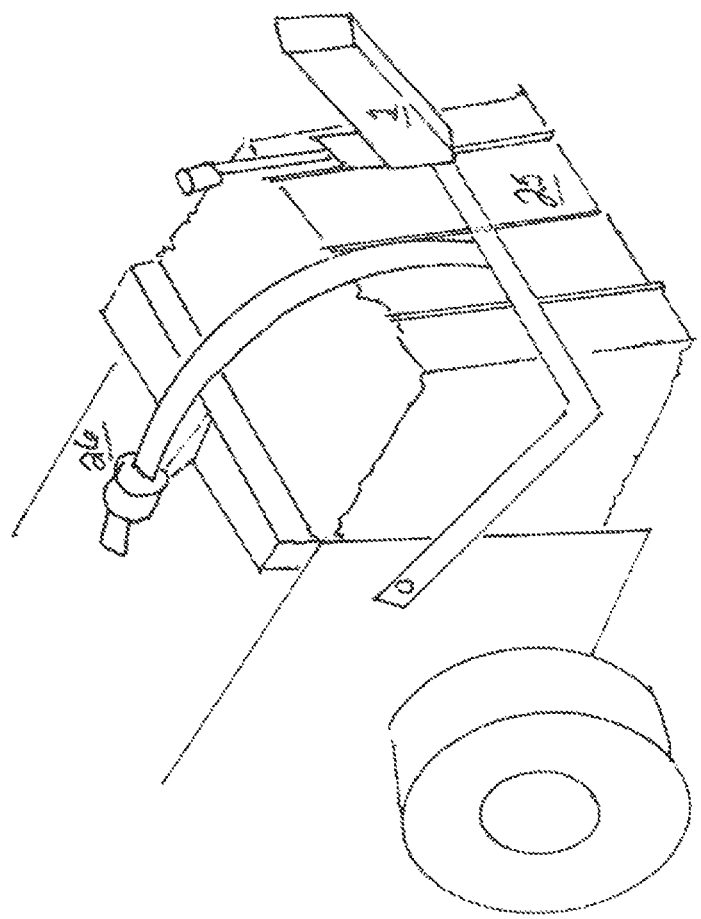
FIG. 7 is a top view of the tagging device positioned at the end of the bale

The tagging device 1 can alternatively apply a tag around the twine on the back of the bale 25 in FIG. 7. In this configuration the tagging device is re-positioned above the bale by an actuator 26 that moves the device to allow for the bale to be discharged.

What is claimed:

1. A tagging device for attaching a clip-style identification tag to the twine of a hay bale comprising a magazine of tags, an inserter to push the tag onto one of the twines holding the hay bale and a plunger to power the inserter located above the bale being formed in a position so that tag with a slot is lined up with the twine so that when the inserter is powered it pushes the tag onto the twine and when the inserter retracts, the tag stays with the bale.

2. A device as in claim 1 where the tagging device is mounted tilted away from the direction of travel of the bale between ten and thirty degrees.

3. A device as in claim 1 where a plunger powered by air, hydraulic pressure or electricity pushes an inserter down so that it pushes a rigid tag to a position around the twine.

4. A device as in claim 1 where a rigid tag has a slot in the bottom and one or more retaining ears at the top of the slot oriented horizontally to prevent the twine from leaving the slot when the plunger is retracted.

5. A device as in claim 1 where the device is located above the bale.

6. A device as in claim 1 where the device is located behind the bale during the tagging cycle and subsequently re-positioned above the bale to allow for the discharge of the bale.

* * * * *